Nov. 29, 1949     B. VALLANCE     2,489,440
CONVEYER
Filed June 7, 1946     14 Sheets-Sheet 4
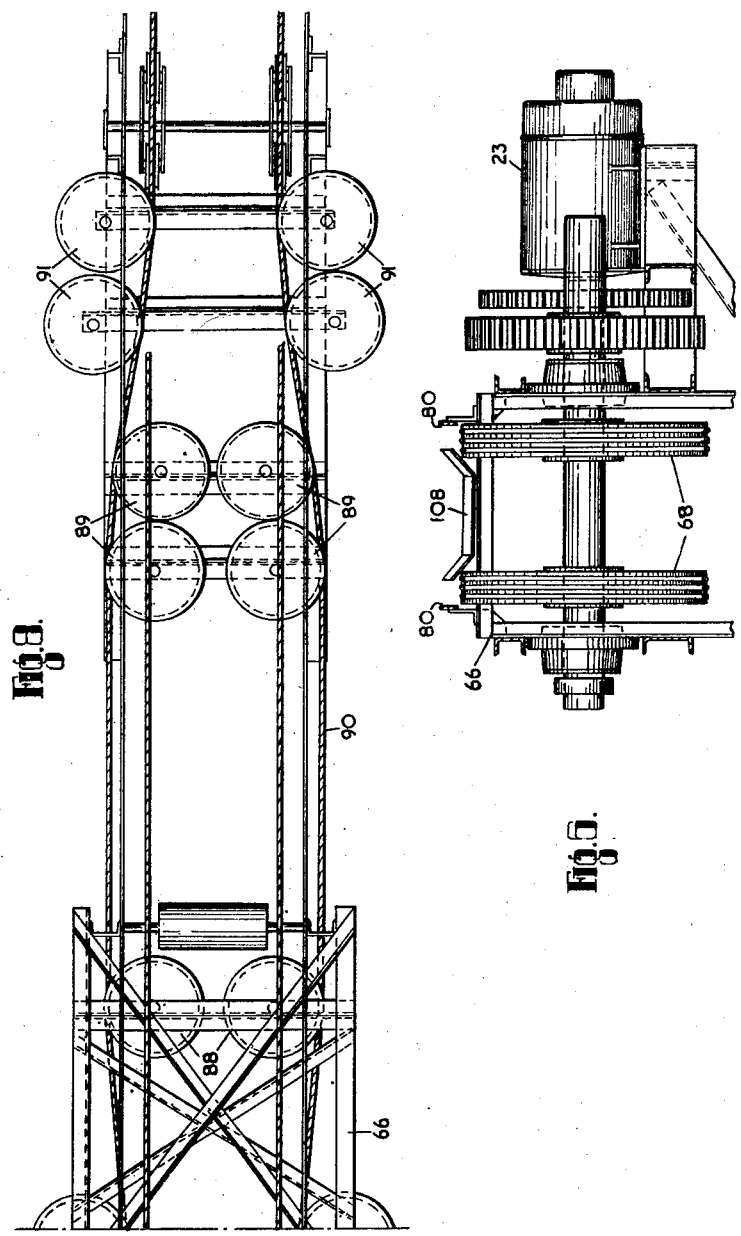
Bertram Vallance
Inventor
By John James Victor Armstrong
Attorney

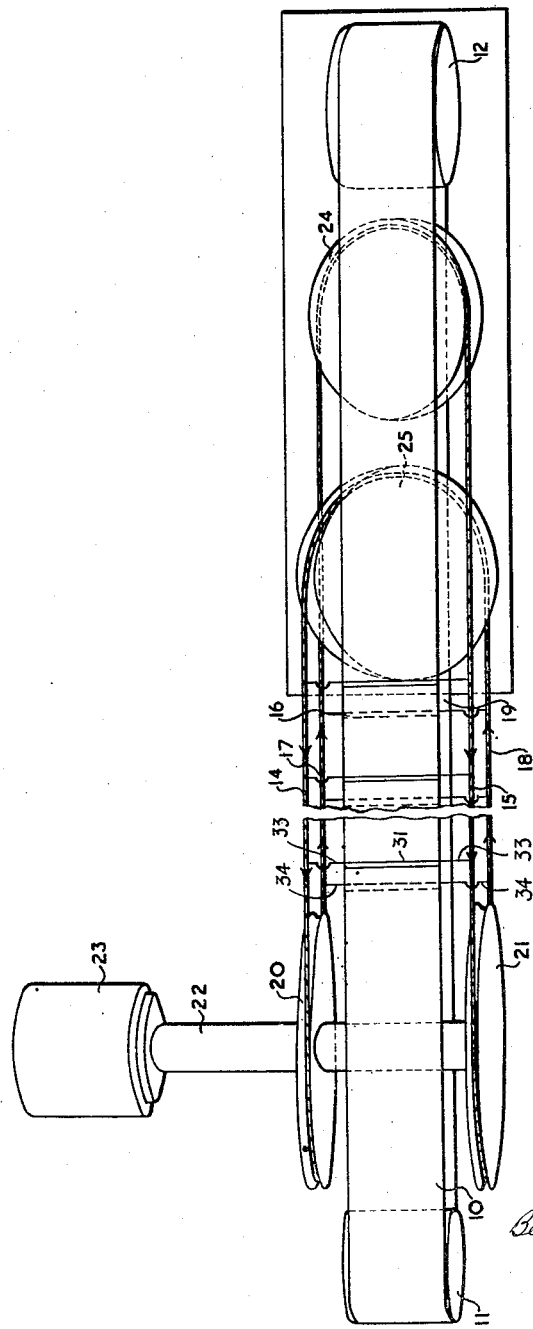

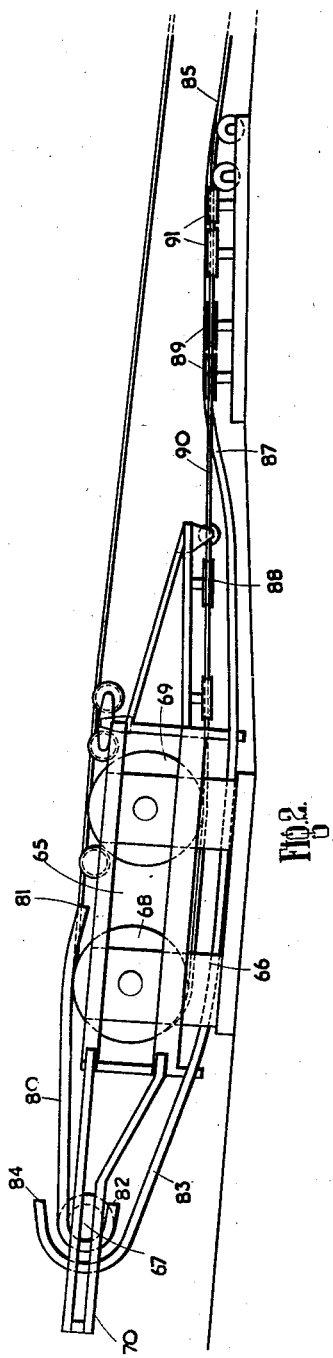

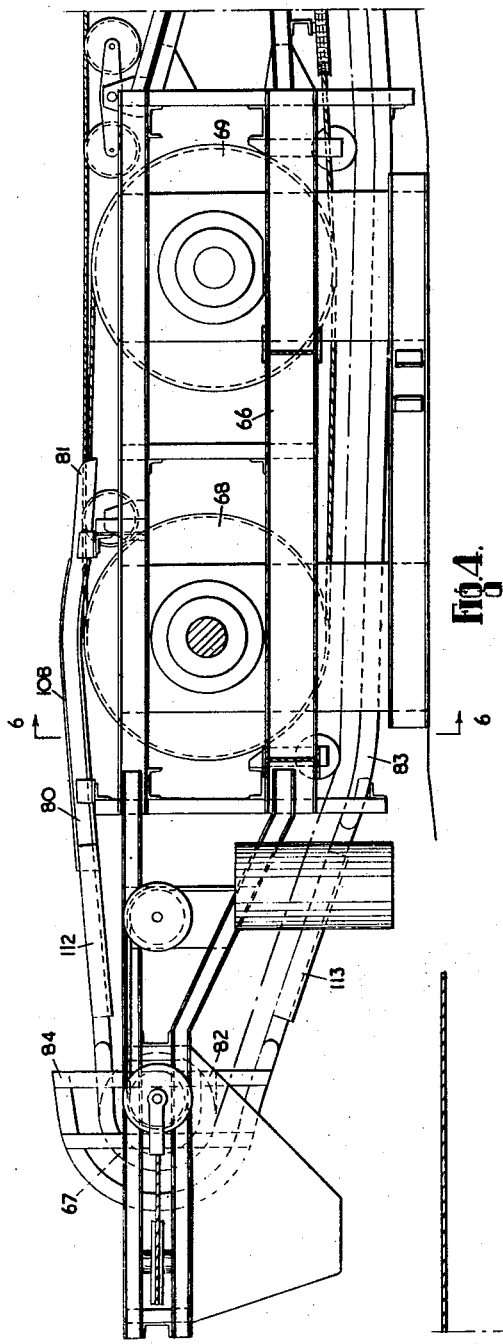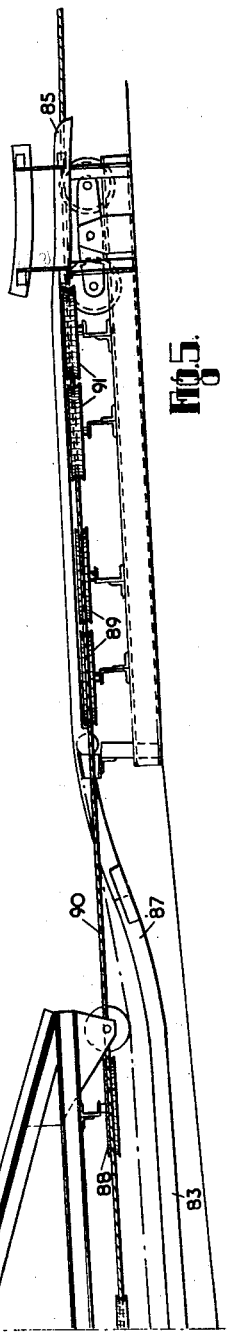

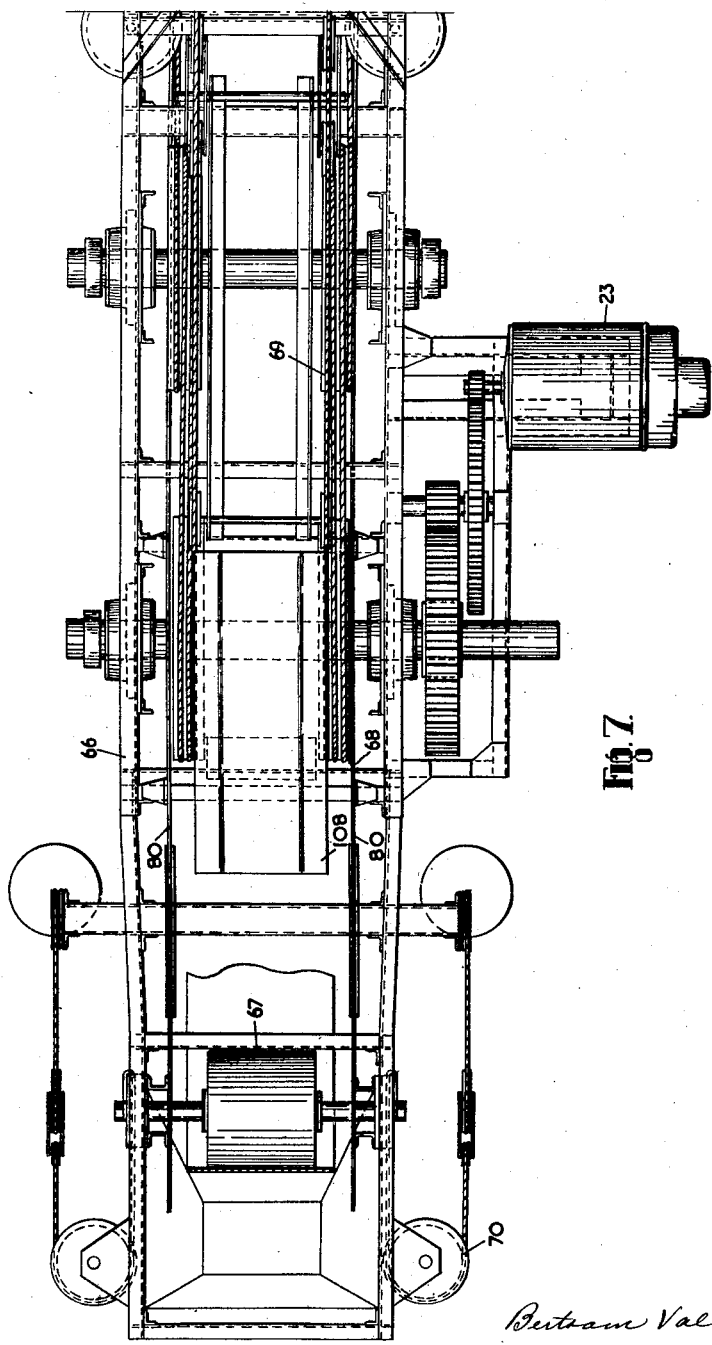

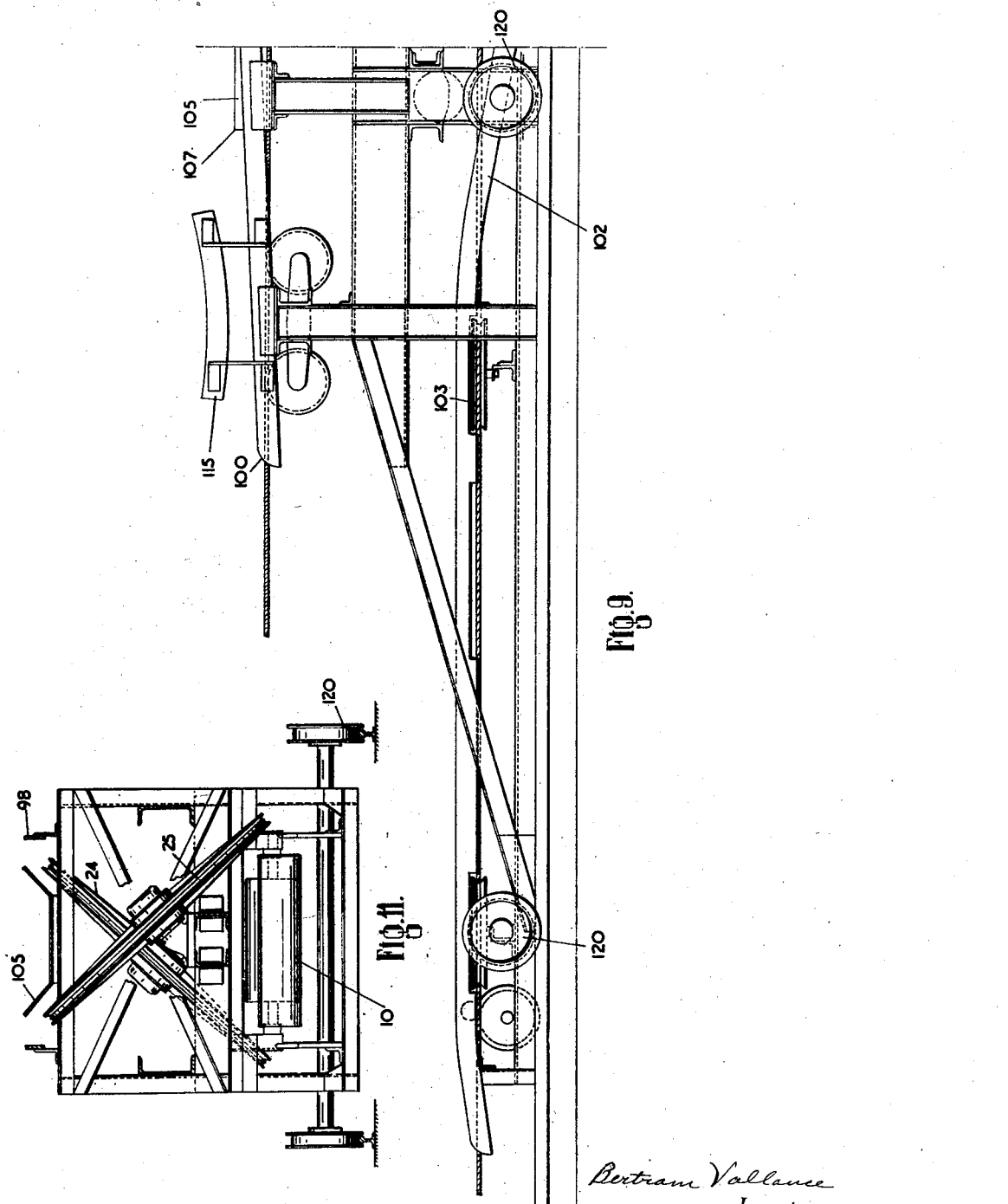

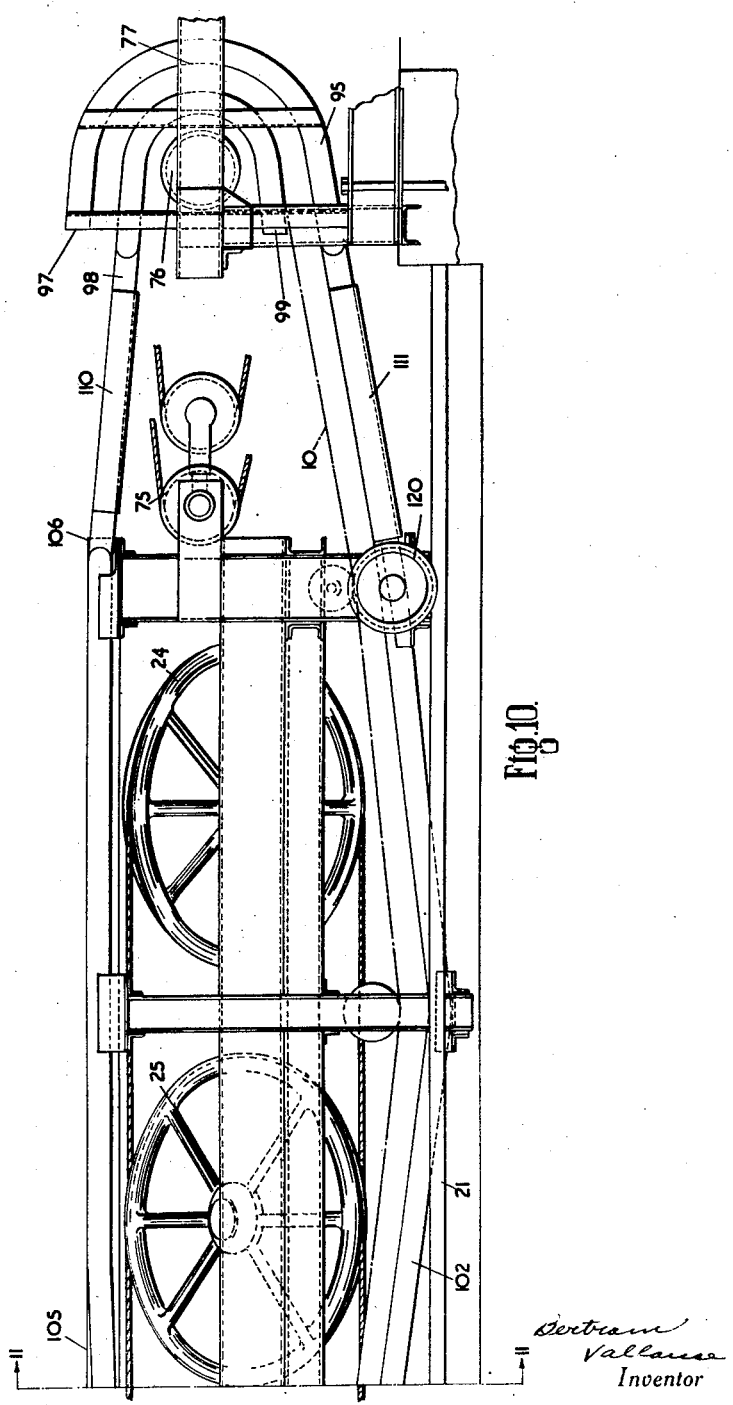

Nov. 29, 1949     B. VALLANCE     2,489,440
CONVEYER

Filed June 7, 1946     14 Sheets-Sheet 8

Bertram Vallance
Inventor

By John James Victor Armstrong
Attorney

Nov. 29, 1949     B. VALLANCE     2,489,440
CONVEYER

Filed June 7, 1946     14 Sheets-Sheet 9

Bertram Vallance
Inventor

By John James Victor Armstrong
Attorney

Nov. 29, 1949   B. VALLANCE   2,489,440
CONVEYER

Filed June 7, 1946   14 Sheets-Sheet 10

Bertram Vallance Inventor

By John James Victor Armstrong
Attorney

Nov. 29, 1949　　　B. VALLANCE　　　2,489,440
CONVEYER
Filed June 7, 1946　　　14 Sheets-Sheet 11
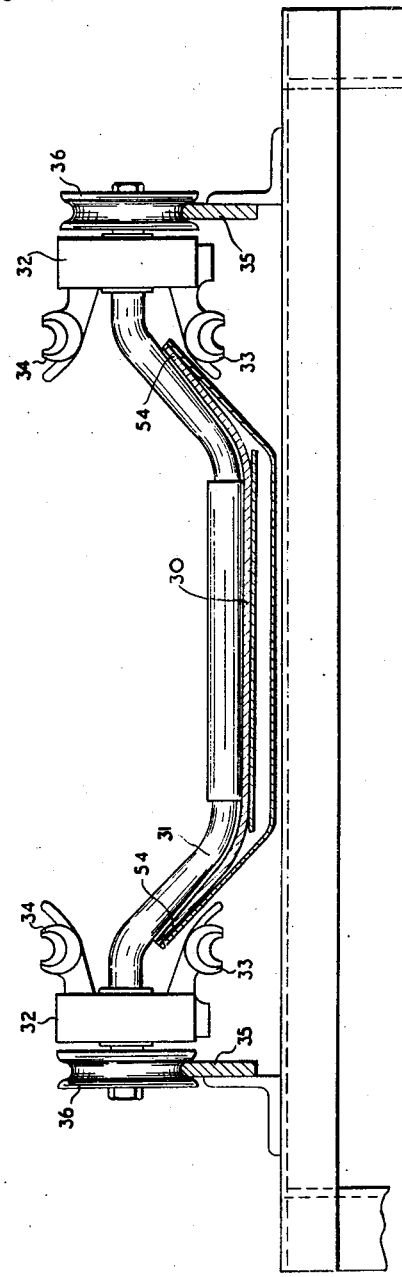
Bertram Vallance
Inventor
By John James Victor Armstrong
Attorney

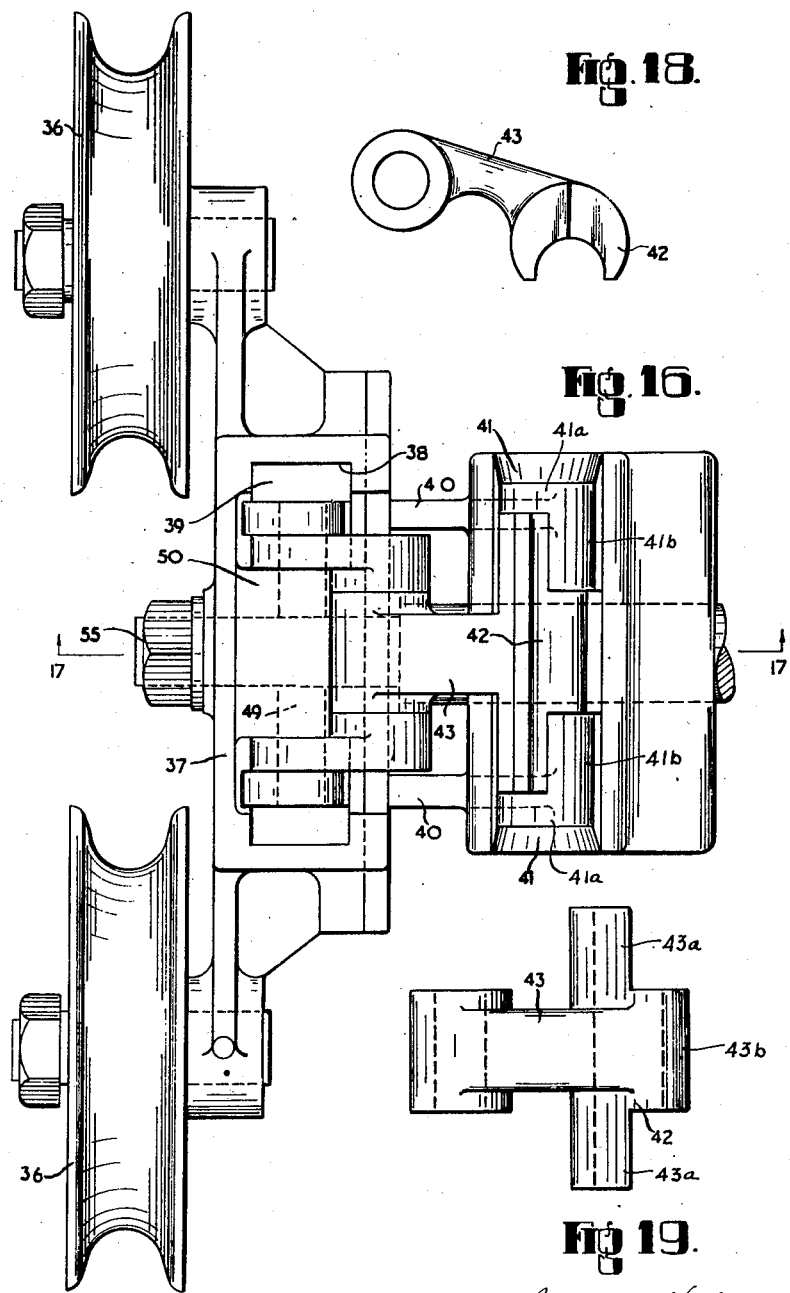

Nov. 29, 1949  B. VALLANCE  2,489,440
CONVEYER
Filed June 7, 1946  14 Sheets-Sheet 13
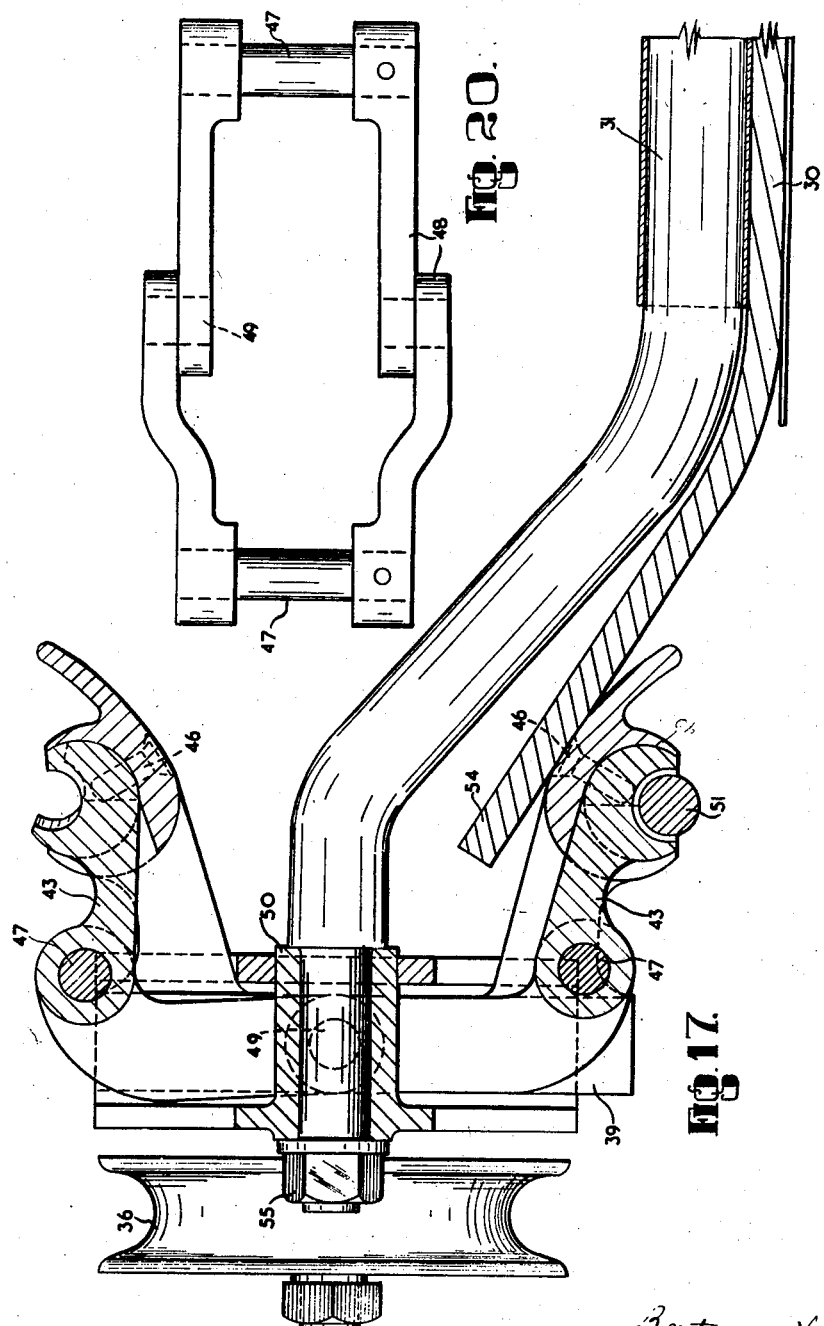
Bertram Vallance
Inventor
By John James Victor Armstron
Attorney Nov. 29, 1949   B. VALLANCE   2,489,440
CONVEYER
Filed June 7, 1946   14 Sheets-Sheet 14
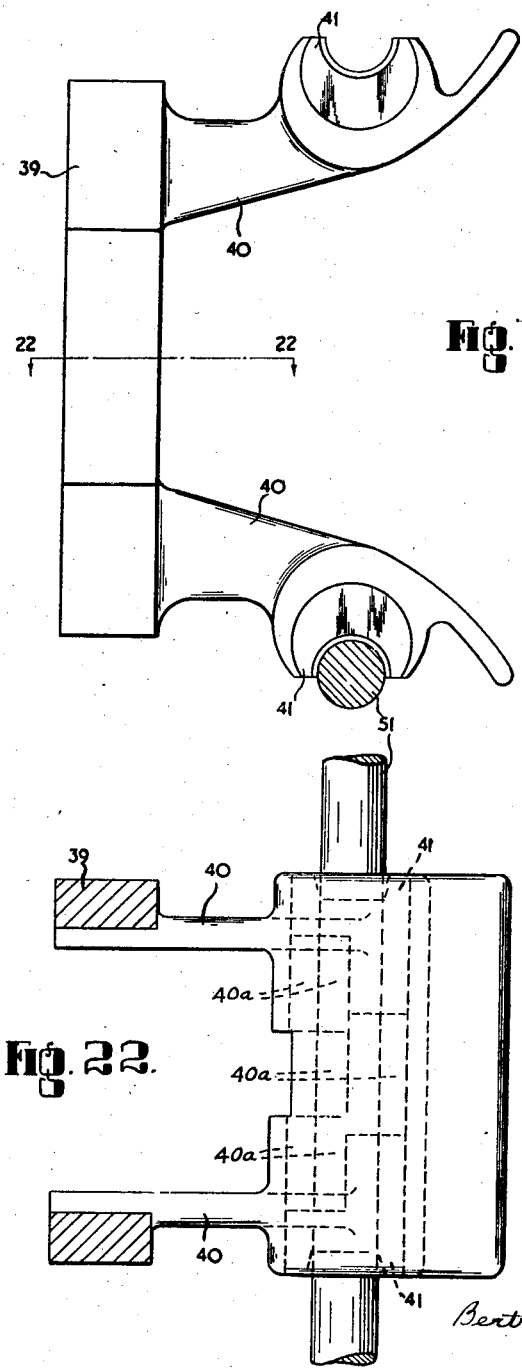

Patented Nov. 29, 1949

2,489,440

UNITED STATES PATENT OFFICE 2,489,440

CONVEYER

Bertram Vallance, Golborne, England, assignor to
Naylor Brothers Limited, Golborne, England Application June 7, 1946, Serial No. 674,957
In Great Britain May 3, 1945

Section 1, Public Law 690, August 8, 1946
Patent expires May 3, 1965

13 Claims. (Cl. 198—203)

The present invention relates to conveyors.

It is known to provide conveyors in the form of endless belts for the conveyance of solid materials such as coal and ores. In most, if not all, of these the belt is supported at intervals by rollers so that the load is held by the belt alone in the spaces between adjacent rollers, the length of these spaces being determined by the nature of the material being conveyed and the strength of the belting. The supporting rollers are usually so arranged as to maintain a trough-like formation of the belt. In addition to supporting the load in the spaces between the rollers, it will be appreciated that such belts must, in addition, be strong enough to transmit the drive.

Difficulties are encountered when such belt conveyors are to be used at a substantial inclination to the horizontal especially when the length of the conveyor is considerable. It will be appreciated that where the conveyor is inclined the weight of the material being conveyed and the weight of the belt itself produce considerable tension in the belt and this increases as the inclination of the conveyor is increased, or as its length is increased.

Problems of this kind arise in mines, especially coal mines, where it may be necessary to provide a conveyor which is, for example, over one hundred yards long or even over one thousand yards long, and may be inclined at a gradient of 1 in 6 or steeper.

According to the present invention an endless belt or the like conveyor is adapted to support a load on one run or traverse thereof, and along this run, which is substantially free of driving tension, is supported and driven by one or more ropes under driving tension.

The belt or the like conveyor may be arranged to rest on said rope or ropes and driven by its frictional engagement therewith. Alternatively the belt may have automatically detachable connections with the rope or ropes.

According to another feature of the present invention a conveyor plant is provided in which a belt or equivalent conveyor has automatically detachable connections at intervals along its length to a rope from which it is driven and/or derives support.

More particularly a belt or equivalent conveyor is driven and/or derives support according to the present invention through automatically detachable connections on opposite sides thereof at intervals along its length to two lengths of rope running in the same direction and forming different parts of the same continuous rope.

According to another aspect of the invention a belt or equivalent endless conveyor is supported, at least along its upper or load carrying run by two lengths of rope, preferably forming different parts of the same continuous rope, but is disengaged from the rope at the ends of its path where it is supported from rails.

Another important feature of the invention comprises a continuous rope supporting a continuous conveyor belt, wherein the rope is so arranged that it moves adjacent one edge of the conveyor belt in one direction of its travel, then adjacent to the same edge of the belt in the reverse direction of its travel, then adjacent to the opposite edge in said first direction and then adjacent to said opposite edge in the reverse direction.

It will be appreciated that the use of a single continuous rope according to the invention will ensure that both runs of rope travelling in the same direction will travel at the same speed.

The conveyor is preferably supported and driven by the said rope through box heads connected to the conveyor. The box head is a device which has a gripper jaw adapted to engage and grip a rope. Preferably each box head has lower and upper gripper jaws to co-operate with upper and lower runs of supporting rope to enable the belt to be supported from the rope along its upper and lower runs.

The box heads may be provided with wheels which engage rails adjacent the ends of the conveyor path whereby the gripper jaws are relieved of the load of the belt and are thereby automatically released from the rope.

The said detachable connections or box heads may support the margins of the belt to impose upon the belt a trough-like cross sectional form and the level of the belt margins at the detachable connections or box heads may be above the level of the rope so that the sag of the belt intermediate the connections or box heads enables intermediate lengths of the belt to rest upon the rope whereby to assist in the maintenance of said trough-like cross sectional form of the belt between the detachable connections or box heads.

The grippers of the box heads may extend towards the rope either outwardly from the box heads away from the belt, but preferably they extend inwardly from the box heads towards the belt in order to provide support for the margins of the belt and thus to impart a trough-like cross section to the belt.

If the grippers of the box heads extend outwardly away from the belt then the box heads may be provided with special extensions for supporting the margins of the belt or alternatively a trough-like cross sectional form may be imparted to the belt by means of troughing rollers arranged beneath the belt. The use of troughing rollers is however, relatively expensive in that the troughing rollers need to be fairly closely spaced and involve the need for supports and bearings for the same. The marginal support of the belt or other conveyor, by means of the box heads and by means of the rope eliminates the necessity of troughing rollers and the expense thereof.

Fixed troughs may be provided beneath the upper run of the belt in regions at each end thereof where the conveyor is unsupported by the rope in order to impart a trough-like cross section to the belt in those regions.

The conveyor may be secured at longitudinally spaced intervals to transverse shallow U-shaped hangers whose ends are journalled in the box heads.

Each box head may comprise a box head beam having a bearing boss for receiving the end of one of said hangers, a sliding jaw member having jaw inserts and jaw elements complementary to said jaw inserts and pivotal relatively to the sliding jaw member. Said jaw elements may be pivoted to links which are pivoted to pivot pins extending from opposite sides of the bearing boss.

Means are provided for applying tension to the rope at one end of the conveying path and to the conveyor at both ends.

The rope and the conveyor may extend from a loading station to a discharge station each of which is provided with upper and lower shunt rails for supporting the conveyor at the ends of its path of travel, and the upper and lower shunt rails may overlap in spaced parallel relationship at their adjacent ends to guide the box heads from the upper run to the lower run or vice versa.

At the loading and discharge stations guide pulleys may be provided for increasing the transverse spacing of the lower runs of the rope over a length of the path of travel where the lower shunt rails are inclined relatively to the path of the rope to enable the box heads to pass between the lower rope lengths from above the rope to below or vice versa.

The rope driving pulleys are preferably located at the discharge station and rope transfer pulleys are provided at the loading station for transferring the rope diagonally from a lower run on one side of the conveyor to an upper run on the other side and vice versa. Said transfer pulleys preferably consist of two oppositely inclined pulleys.

In a preferred arrangement the loading station is mounted on a longitudinally displaceable framework to which a load is applied to tension the rope, whilst the conveyor at each end of its run passes over a roller or drum which is displaceable longitudinally of the loading or discharge station and to which loading is applied for tensioning of the conveyor, the overlapping ends of the shunt rails being respectively concentric with said rollers and the shunt rails being extensible to enable the overlapping end portions thereof to remain concentric with said rollers on longitudinal displacement thereof.

The invention is more particularly described with reference to the accompanying drawings which show one preferred form of construction of the invention by way of example and in which:

Figure 1 is an explanatory diagrammatic perspective view of a rope and belt according to the invention which shows purely diagrammatically the relation of the upper and lower lengths of the rope and the upper and lower runs of the belt.

Figures 2 and 3 are complementary side elevations showing the essentials of a complete installation according to the present invention with the driving and discharge end of the installation shown at the left-hand side of Figure 2 and the loading end of the installation at the right-hand side of Figure 3.

Figures 4 and 5 are complementary side views showing the driving and discharging end of the installation more in detail and to a larger scale.

Figure 6 is a fragmentary sectional end view on the line 6—6 of Figure 4.

Figures 7 and 8 are complementary plan views corresponding to Figures 4 and 5.

Figures 9 and 10 are complementary side views showing the loading and tensioning end of the installation more in detail and to a larger scale.

Figure 11 is a sectional view taken on the line 11—11 of Figure 10.

Figure 15 is an end view showing the belt supported by a hanger with box heads at opposite ends thereof, and supported on a pair of shunt rails.

Figure 16 is a plan view of a box head showing a portion of the hanger.

Figure 17 is a part sectional view on line 17—17 of Figure 16 showing a portion of the hanger and a portion of the belt.

Figures 18 and 19 are a side elevation and plan respectively of a moving jaw of the box head.

Figure 20 illustrates the links to which the moving jaws are pivoted.

Figure 21 is a side view of a fixed jaw.

Figure 22 is a sectional plan view of a fixed jaw on the line 22—22 of Figure 21.

Figure 12:
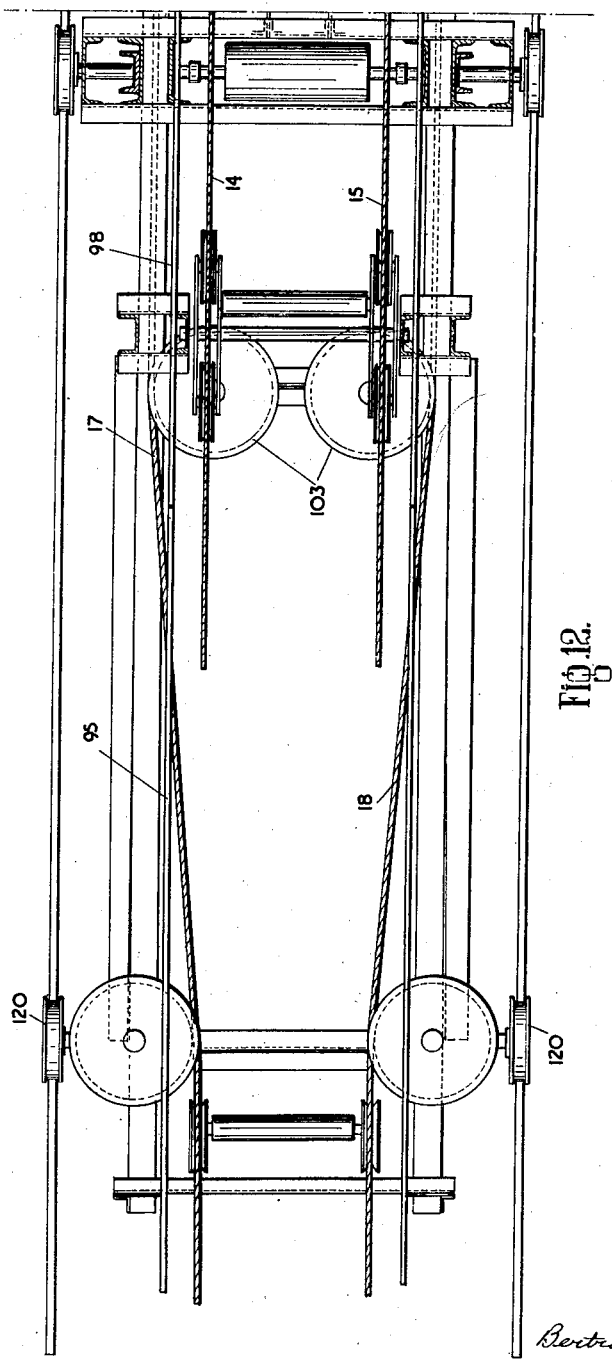
Figures 12 and 13 are complementary plan views corresponding to Figures 9 and 10.

Referring to Figure 1 it will be seen that a conveyor belt 10 which may be of any desired length is mounted on belt drums 11, 12. Over the major portion of its length the belt is supported and driven by an endless rope of which the two upper runs 14, 15 run adjacent the upper run 16 of the belt and two lower runs 17, 18 adjacent the lower run 19 of the belt. The rope is driven by driving pulleys 20, 21 mounted on a common shaft 22 which is driven by a motor 23. The directions of movement of the rope and the belt are shown by the arrows and it will be seen that the upper run 14 moves from right to left and then over the driving pulley 20 when it becomes the lower run 17 moving from left to right. The lower run 17 passes over an inclined pulley 24 when it becomes the upper run 15, moving from right to left, and then the lower run 18 passes over the oppositely inclined pulley 25 to become the upper run 14 moving from right to left. By use of the inclined pulleys 24, 25 both upper runs move in the same direction and as they form part of a single length of rope they are bound to run at the same speed.

The conveyor belt is driven from the endless rope by means of upper and lower gripper jaws which are provided at each end of a series of hangers or cross members. The hangers 31 are secured to the conveyor belt 10 and are disposed at equal spaced intervals throughout the entire length of the conveyor belt. The upper run 16 of the belt 10 is driven by the upper lengths of the rope 14, 15 by means of the lower gripper jaws 33, and the lower run 19 by the lower lengths of the rope 17, 18 by means of the upper gripper jaws 34. In Fig. 1, which is a purely diagrammatic representation to show the relation between the lengths of the rope and the upper end lower runs of the belt, jaws are only shown in those portions of the conveyor in which they grip the rope. It will nevertheless be understood that the gripper jaws and hangers are disposed throughout the length of the belt. It will also be understood that the gripper jaws are inwardly directed from the ends of the hangers as is described hereafter. The hangers, box-heads and gripper jaws are illustrated in Figs. 14 to 22. Referring to Figure 15 it will be seen that the conveyor belt 30 is secured to a hanger or cross member 31 which is of shallow U-form and has a box head 32 at each end.

Each box head has two jaws namely a lower jaw 33 and an upper jaw 34. The lower jaws 33 are adapted to engage and grip the rope during travel along the upper run of the belt whilst the upper jaws 34 become the lower jaws when the box head reaches the lower run of the belt whereupon the box heads 34 are adapted to engage the rope. The box heads are adapted to support the belt from the rope during the major portion of the path of travel of the conveyor between the loading and discharge stations and vice versa. At the loading and discharge stations the box heads are released from the rope by means of shunt rails 35 which engage wheels 36 mounted on the box heads, whereby to transfer the load from the rope to the rails and thus to relieve the gripping pressure of the box head jaws on the rope.

Referring to Fig. 16 it will be seen that each box head is provided with two wheels 36 which are journalled on a box head beam 37. The box head beam 37 has vertical guide ways or channels 38 in which it receives the slides 39 of a sliding jaw member 40 (see also Figs. 21 and 22). Sliding jaw member 40 has jaw inserts 41 (Figs. 16 and 21) extending from the ends part way towards the centre. The jaw inserts 41 are approximately semi-cylindrical in cross-section at their outer ends 41a whilst the inner portion 41b thereof is only approximately quarter circular in cross-section. The jaw inserts 41 are fixed in position by means of screws 46 shown in dotted lines in Fig. 17. Jaws 42 of pivoted jaw members 43 are approximately quarter circular in cross-section at their outer ends 43a and are approximately semi-circular at their middle portions 43b. The inner quarter circular portions 41b of the jaw elements 41 are complementary to the outer quarter circular portions 43a of the jaws 42. Each pivoted jaw member 43 is received in a recess 40a (Fig 22) in the sliding jaw member 40 between the jaw inserts 41 and is capable of limited rotation in said recess. The jaw members 43 are pivoted to the ends 47 of links 48 which are pivoted at 49 (Fig. 20) to oppositely disposed pins secured in the boss 50 (Fig. 17) of the box head beam 37. The composite jaw thus formed by the sliding jaw member 40 with its inserts 41 and the pivoted jaw member 43 may be opened to release the rope 51 or closed to grip the rope 51 by the rotation of the jaw element 42 relative to the jaw element 40. At the time when the wheels 36 run off a shunt rail the jaw elements 41 and 42 will be in contact with the rope 51. Lack of the support previously furnished to the wheels 36 by the shunt rail 35 allows the box head to fall and causes the weight of the conveyor and box head to be transferred to the rope and thereby causes the box head beam 37 to move downwards relative to the sliding jaw member 40. This downward motion causes anti-clockwise rotation (Fig. 14) of the pivoted jaw member 43 and thereby causes the composite jaw to close and grip the rope 51. Upward movement of the box head beam 37 relative to the sliding jaw member 40 causes clockwise rotation (Fig. 14) of the pivoted jaw member 43 thereby causing the composite jaw to open and to release rope 51. Such upward motion occurs when the wheels 36 run on to a shunt rail which thereby provides an upward force to support the weight of the conveyor.

The ends of the hangers 31 are secured in the bosses 50 of the box head beams by nuts 55.

Figure 14:
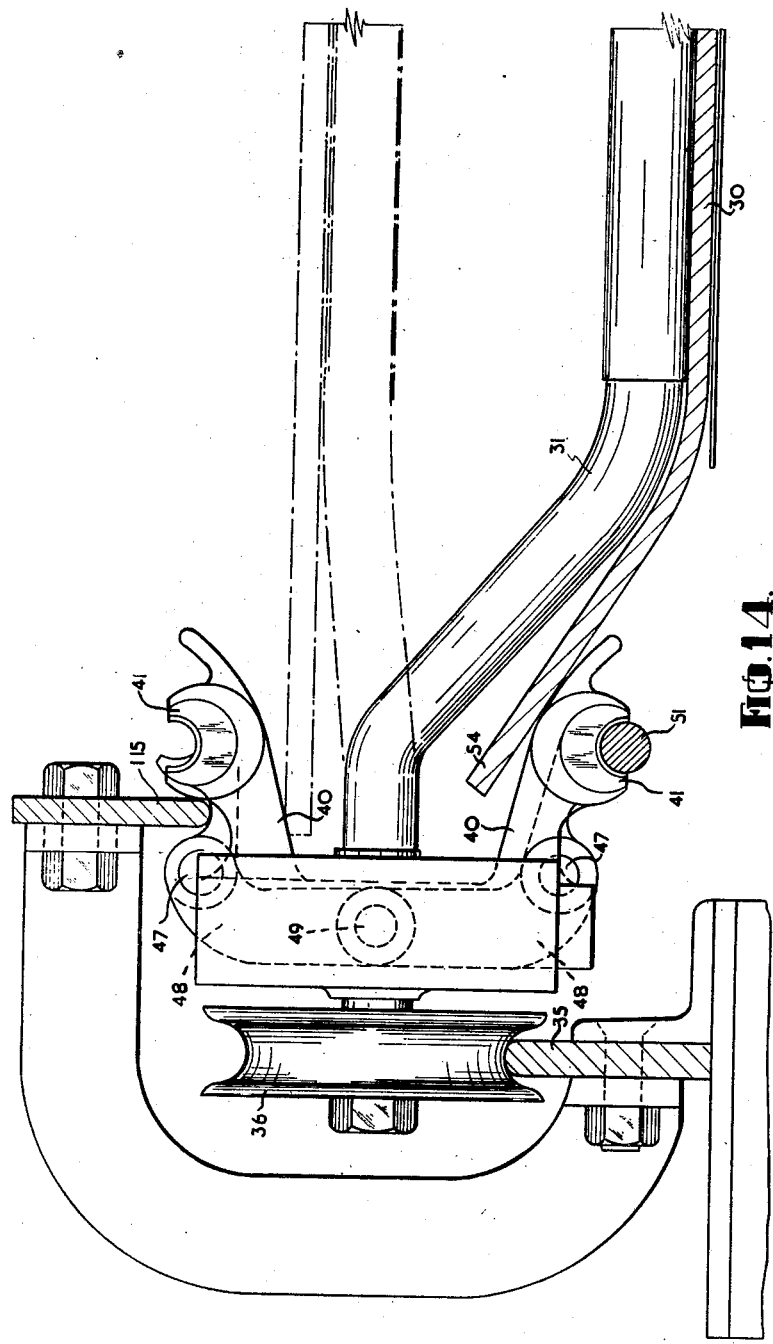
Figure 14 is a cross sectional view of the belt with its supporting hanger and box head with the box head in position on a shunt rail and shows in broken lines the relative positions of the box head and belt in the lower run of the belt.

Referring to Figures 14, 15 and 17 it will be seen that as the jaws of the box head are directed inwardly the lowermost jaw of each box head affords a support for the margin 54 of the belt so as to impart a trough-like shape to the belt.

It will be observed that the margins of the belt are a little above the level of the rope at the box heads. The sag in the belt between the box heads will however, result in the margins of the belt being supported by the rope over a portion of the longitudinal space between the box heads whereby to maintain the trough-like shape of the belt from one box head to the next.

This maintenance of the trough-like cross sectional shape of the belt from box head to box head avoids the necessity of providing troughing rollers at relatively short intervals beneath the upper run of the belt and in most installations it is possible entirely to avoid using troughing rollers as is the case in the example shown in Figure 2 wherein a conveyor with a total length of approximately 150 ft. is supported only at the centre by a trestle 60 (Figure 3) which has rope supporting pulleys 61 and belt supporting rollers 62 mounted on a duplex lever arrangement in which a main lever pivoted to the trestle supports subsidiary levers pivoted thereto, each pair of subsidiary levers having a roller 62 journalled therebetween with a pair of pulleys 61 journalled on each lever on opposite sides of the roller 62.

The driving and discharge station generally denoted by the numeral 65 in Figure 2 consists of a frame work generally denoted by the numeral 66 which supports a belt pulley 67 and rope driving pulleys 68, 69. The frame work 66 and rope driving pulleys 68, 69 are fixed longitudinally but a tension device generally denoted by the reference numeral 70 is provided for applying tension to the belt through belt pulley 67 as will be observed by reference to Figures 4 and 6. The rope passes three times around the pulleys 68, 69, to ensure adequate frictional grip between the rope and pulleys.

At the loading station generally indicated by the reference numeral 72 (Figure 3) the respective runs of the rope pass over inclined pulleys 24 and 25 which are mounted in a frame generally indicated by the reference numeral 73.

Figure 13:
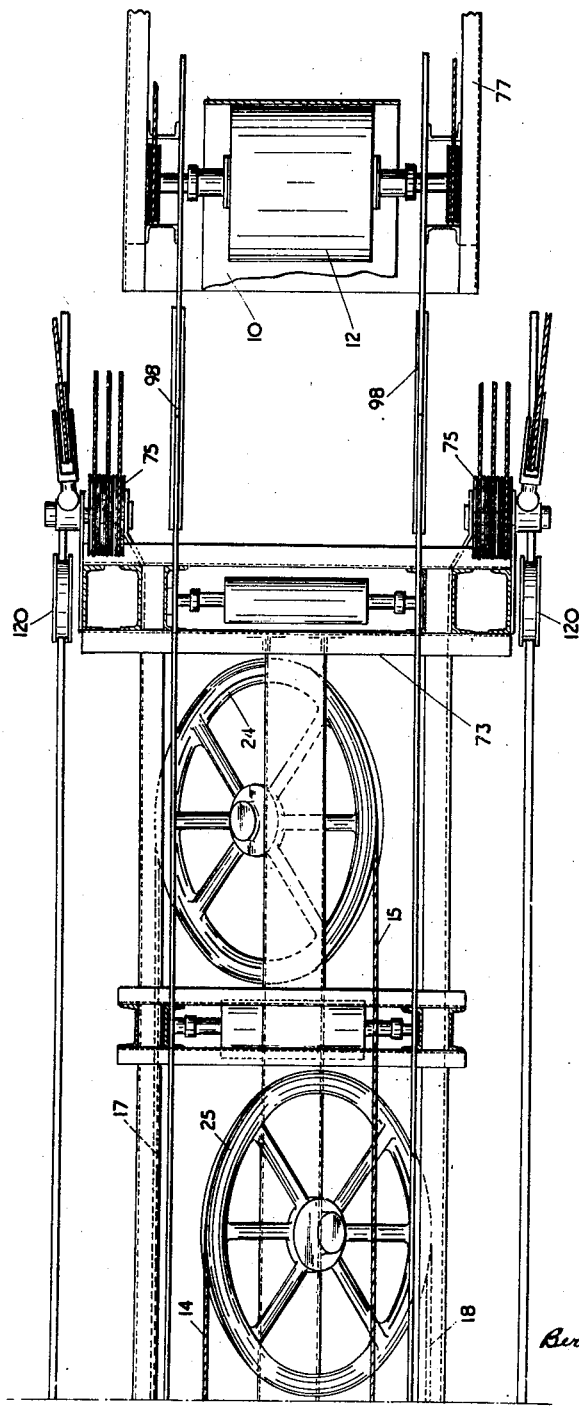

The frame 73 is mounted on wheels 120 which run on rails 121 (Figures 9 and 10) so that it is movable in the longitudinal direction of the conveyor and is provided with a tensioning device generally indicated by the reference numeral 75 (Figure 13) whereby to apply longitudinal tension to the rope. The belt pulley 76 supported by the frame 73 is provided with an independent tensioning means generally indicated by the reference numeral 77 in Figures 10 and 13. Thus the conveyor belt is tensioned at both ends whilst the rope is tensioned at the loading end only.

At the driving and discharge station there are upper shunt rails 80 commencing at the point 81 and finishing at the point 82, and there are lower shunt rails 83 commencing at the point 84 and finishing at the point 85 (Figures 2 and 4). As a box head reaches the point 81 the box head wheels engage the shunt rail 80 to release the box head from the rope, whereupon the box head is towed by the belt around the driving station.

To enable the box heads as they leave the driving station to pass between the runs of the rope and to move from below the rope to above the rope, the shunt rails 83 are inclined upwardly in the region 87 whilst the lower runs of the rope are caused to diverge by means of guide pulleys 88, 89, over the stretch of their run 90, and are then caused to reconverge to their original spacing by pulleys 91.

As the box heads move around the belt pulley 67 at the extreme end of the run they will be guided between the parallel overlapping ends of the shunt rails 80, 83.

At the loading station there are a pair of lower shunt rails 95 which begin at the point 96 and end at the point 97 and a pair of upper shunt rails 98 begin at the point 99 and end at the point 100 (Figures 3, 9 and 10). The box heads disengage the rope at the point 96 and re-engage the rope at the point 100.

To enable the box heads to pass between the lower runs of the rope at the loading station so as to move from a position above the rope to a position below the rope whereby to occupy a position above the rope when they reach the upper run of the conveyor, the lower shunt rails 95 slope downwardly in the region 102 and the lower runs of the rope are caused to diverge by guide pulleys 103 from which the rope runs directly to the inclined transfer pulleys 24, 25 (see Figures 9, 10, 12 and 13).

To maintain the trough-like cross sectional form of the belt at the loading station, the loading station is provided with a steel trough 105 whose ends are defined by the numerals 106, 107 (Figures 9 and 10), whilst a similar trough 108 is provided at the driving and discharge station (Figure 6).

To allow for displacement of the belt pulley or roller 76 under the influence of the tensioning means 77 the upper and lower shunt rails 98, 95 of the loading station (Figure 10) are provided with telescopic rail sections 110, 111. The shunt rails of the driving and discharge station are similarly provided with telescopic rail sections 112, 113 (Figure 4). These telescopic rail sections are of U-shaped cross section.

There is a possibility that as the box heads reach the point 100 at the end of the shunt rails 98 the sliding jaws may be jammed in a relatively high position which would prevent the composite jaws of the box head from opening fully ready to receive the rope. To ensure that the jaws are fully open as the box heads reach the point 100 depression plates 115 are provided above the shunt rails 98 just before the point 100 (see Figures 9 and 14). These depression plates engage the pivoted jaws 43 so as to apply downward pressure to the sliding jaws 40 of the box heads whereby to depress them and to ensure that the composite jaws are fully open ready to receive the rope.

I declare that what I claim is:

1. In a conveyor plant, a conveyor extending along a conveying path, a continuous rope including lengths running in the same direction adjacent opposite margins of the conveyor, shallow U-shaped hangers secured to the conveyor at longitudinally spaced intervals, box heads mounted on opposite ends of said hangers, said box heads including gripper jaws adapted to engage and grip the rope, said gripper jaws being directed inwardly from the box heads towards the conveyor so as to support the margins of the conveyor and thus to impart a trough-like cross section to the conveyor.

2. In a conveyor plant, a conveyor extending along a conveying path, a continuous rope including lengths running in the same direction adjacent opposite edges of the conveyor, shallow U-shaped hangers secured to the conveyor at longitudinally spaced intervals, gripper means on opposite ends of said hangers and adapted to grip the rope, said gripper means being adapted to support the margins of the conveyor at a level above the level of the rope so as to impart a trough-like cross-sectional form to the conveyor at the hangers, the sag of the conveyor between the hangers being sufficient to allow the conveyor margins to rest upon the rope therebetween thereby tending to maintain said trough-like cross sectional form of the conveyor between the longitudinally spaced hangers.

3. In a conveyor plant, a conveyor extending along a conveying path, a continuous rope including lengths running in the same direction adjacent opposite edges of the conveyor, rails on opposite sides of said path at its ends of the conveying path, shallow U-shaped hangers secured to the conveyor at longitudinally spaced intervals, box heads journalled at opposite ends of said hangers, wheels on said box heads adapted to engage said rails to suport the box heads and conveyor at the ends of the conveying path, said box heads including grippers, adapted, when said wheels leave said rails, to engage and grip the rope so as to support the conveyor therefrom and also to support the margins of the conveyor so as to impart a trough-like cross section thereto and troughs arranged beneath the conveyor at the ends thereof to maintain the trough-like cross-section of the belt when said wheels are engaged with said rails and the grippers disengaged from the rope.

4. In a conveyor plant, a conveyor extending along a conveying path, a continuous rope including lengths running in the same direction along opposite sides of the conveying path, and automatically detachable connections between said conveyor and said lengths of rope spaced at intervals along said path, said automatically detachable connections consisting of box heads secured to the conveyor and each embodying a box head beam, a sliding jaw member, jaw inserts in said jaw member and jaw elements complementary to said jaw inserts and pivoted relatively to said sliding jaw member.

5. In a conveyor plant, a conveyor extending along a conveying path, a continuous rope including lengths running in the same direction along opposite sides of the conveying path, and automatically detachable connections between said conveyor and said lengths of rope spaced at intervals along said path, said automatically detachable connections comprising transverse hangers secured to the belt and box heads journalled one at each end of said hangers and embodying a box head beam having a boss for receiving the end of a hanger, a sliding jaw member, jaw inserts in said jaw member, a link pivoted to said boss and a jaw element pivoted to said link and complementary to said jaw inserts.

6. In a conveyor plant, a conveyor including an upper run and a lower run extending along a conveying path, a continuous rope including upper lengths running in one direction adjacent opposite margins of the upper run of the conveyor, and lower lengths running in opposite direction adjacent opposite margins of the lower run of the conveyor, shallow U-shaped hangers secured to the conveyor at longitudinally spaced intervals, box heads mounted on opposite ends of said hangers, said box heads including lower and upper gripper jaws adapted to engage and grip said upper and lower lengths of the rope, said gripper jaws being directed inwardly from the box heads towards the conveyor so as to support the margins of the conveyor and thus to impart a trough-like cross-section to the conveyor.

7. In a conveyor plant, a conveyor extending along a conveying path, a continuous rope including lengths running in the same direction adjacent opposite margins of the conveyor, rails on opposite sides of the conveyor at the ends of the conveying path, shallow U-shaped hangers secured to the conveyor at longitudinally spaced intervals, box heads mounted on opposite ends of said hangers, said box heads including gripper jaws adapted to engage and grip the rope, said gripper jaws being directed inwardly from the box heads towards the conveyor so as to support the margins of the conveyor and thus to impart a trough-like cross-section to the conveyor, and means for supporting said conveyor from said rails at the ends of the conveying path.

8. In a conveyor plant, a conveyor extending along a conveying path, a continuous rope including lengths running in the same direction adjacent opposite margins of the conveyor, rails at each end of the conveyor on opposite sides thereof, shallow U-shaped hangers secured to the conveyor at longitudinally spaced intervals, box heads mounted on opposite ends of said hangers, said box heads including gripper jaws adapted to engage and grip the rope and including wheels adapted to engage said rails to relieve said gripper jaws of the load of the conveyor and thus to release said jaws from the rope, said gripper jaws being directed inwardly from the box heads towards the conveyor so as to support the margins of the conveyor and thus to impart a trough-like cross-section to the conveyor.

9. In a conveyor plant, a conveyor extending along a conveying path and including an upper run and a lower run, a continuous rope including upper lengths running in one direction adjacent opposite margins of said upper run of the conveyor and lower lengths running in the opposite direction adjacent opposite margins of said lower run of the conveyor, upper and lower shunt rails at each side of the conveyor at the ends thereof, shallow U-shaped hangers secured to the conveyor at longitudinally spaced intervals, box heads mounted on opposite ends of said hangers, said box heads including lower and upper gripper jaws adapted to engage and grip said upper and lower lengths of the rope and including wheels adapted to engage said shunt rails to support the conveyor and to hold said gripper jaws out of engagement with the rope at the ends of the conveyor runs, said gripper jaws being directed inwardly from the box heads towards the conveyor so as to support the margins of the conveyor and thus to impart a trough-like cross-section to the conveyor.

10. In a conveyor plant, a conveyor extending along a conveying path and including an upper and a lower run, a continuous rope including upper lengths running in one direction adjacent opposite margins of said upper run of the conveyor and lower lengths running in the opposite direction adjacent opposite margins of said lower run of the conveyor, upper and lower shunt rails at each side of the conveyor at the ends thereof, shallow U-shaped hangers secured to the conveyor at longitudinally spaced intervals, box heads mounted on opposite ends of said hangers, said box heads including lower and upper gripper jaws adapted to engage and grip said upper and lower lengths of the rope and including wheels adapted to engage said shunt rails to support the conveyor and to hold said gripper jaws out of engagement with the rope at the ends of the conveyor runs, said gripper jaws being directed inwardly from the box heads towards the conveyor so as to support the margins of the conveyor and thus to impart a trough-like cross-section to the conveyor, said upper and lower shunt rails being arcuate and overlapping at their adjacent ends in spaced parallel relationship to guide the box heads from one run of the conveyor to the other.

11. In a conveyor plant, a conveyor extending along a conveying path, a continuous rope including lengths running in the same direction adjacent opposite margins of the conveyor, shallow U-shaped hangers secured to the conveyor at longitudinally spaced intervals, box heads mounted on opposite ends of said hangers, said box heads including gripper jaws adapted to engage and grip the rope, said gripper jaws being directed inwardly from the box heads towards the conveyor so as to support the margins of the conveyor and thus to impart a trough-like cross-section to the conveyor, and means for applying tension to the conveyor at both ends of the conveying path and means for applying tension to the rope at one end of the conveying path.

12. In a conveyor plant, a conveyor extending along a conveying path and including an upper run and a lower run, a continuous rope including upper lengths running in one direction adjacent opposite margins of the upper run of the conveyor and lower lengths running in the opposite direction adjacent opposite margins of the lower run of the conveyor upper and lower shunt rails at each side of the conveyor at the ends thereof, shallow U-shaped hangers secured to the conveyor at longitudinally spaced intervals, box heads mounted on opposite ends of said hangers, said box heads including lower and upper gripper jaws adapted to engage and grip said upper and lower lengths of the rope and including wheels adapted to engage said shunt rails to support the conveyor and to hold said gripper jaws out of engagement with the rope at the ends of the conveyor runs, said gripper jaws being directed inwardly from the box heads towards the conveyor so as to support the margins of the conveyor and thus to impart a trough-like cross-section to the conveyor, a loading station and a discharge station, rope driving pulleys at the discharge station and rope transfer pulleys at the loading station for transferring a lower length of rope on one side of the conveying path to an upper length on the opposite side of the conveying path and vice versa.

13. In a conveyor plant, a conveyor extending along a conveying path and including an upper run and a lower run, a continuous rope including lengths running in one direction adjacent opposite margins of said upper run of the conveyor and lower lengths running in the opposite direction adjacent opposite margins of said lower run of the conveyor, a tensioning roller at each end of the conveyor between said upper and lower runs, said rollers being displaceable in the direction of the conveying path, means for applying a load to each roller to apply tension to the conveyor, upper and lower shunt rails which include fixed sections, telescopic intermediate sections and longitudinally displaceable partly arcuate end sections which overlap in spaced parallel relationship concentric with a tensioning roller, shallow U-shaped hangers secured to the conveyor at longitudinally spaced intervals, box heads mounted on opposite ends of said hangers, said box heads including lower and upper gripper jaws adapted to engage and grip said upper and lower lengths of the rope and including wheels adapted to engage said shunt rails to support the conveyor and to hold said gripper jaws out of engagement with the rope at the ends of the conveyor runs, said gripper jaws being directed inwardly from the box heads towards the conveyor so as to support the margins of the conveyor and thus to impart a trough-like cross-section to the conveyor, said upper and lower shunt rails guiding the box heads from one run of the conveyor to the other.

BERTRAM VALLANCE.

REFERENCES CITED

The following references are of record in the file of this patent:

UNITED STATES PATENTS

| Number | Name | Date |
| --- | --- | --- |
| 773,452 | Ash | Oct. 25, 1904 |
| 826,312 | Catlin | July 17, 1906 |
| 1,586,686 | Mongrain | June 1, 1926 |
| 1,627,354 | Thorsten | May 3, 1927 |
| 1,702,314 | Rankine | Feb. 19, 1929 |
| 1,706,905 | Stockly | Mar. 26, 1929 |
| 1,750,425 | Parker | Mar. 11, 1930 |

FOREIGN PATENTS

| Number | Country | Date |
| --- | --- | --- |
| 509,122 | Germany | May 19, 1931 |